United States Patent
Bregi et al.

[15] 3,659,335
[45] May 2, 1972

[54] COMBINED GEAR SHAVING AND ROLLING MACHINE

[72] Inventors: Benjamin F. Bregi, Grosse Pointe Shores; Carl H. Motz, Harper Woods; Arthur B. Bassoff, Oak Park, all of Mich.

[73] Assignee: Lear Siegler, Inc., Santa Monica, Calif.

[22] Filed: Sept. 29, 1969

[21] Appl. No.: 861,594

[52] U.S. Cl. ..................................29/560, 90/1.6, 72/101
[51] Int. Cl. ..........................................B23f 19/06
[58] Field of Search ..............29/560; 72/86, 101, 102, 103; 90/1.6

[56] References Cited

UNITED STATES PATENTS

| 3,443,478 | 5/1969 | Daniel | 90/1.6 |
| 2,380,261 | 7/1945 | Praeg | 90/1.6 |
| 2,635,507 | 4/1953 | Praeg | 90/1.6 |
| 3,182,558 | 5/1965 | Gates | 90/1.6 |
| 1,001,799 | 8/1911 | Anderson | 72/102 |
| 2,423,932 | 7/1947 | Finzel | 72/102 X |

Primary Examiner—Andrew R. Juhasz
Assistant Examiner—Z. R. Bilinsky
Attorney—Whittemore, Hulbert & Belknap

[57] ABSTRACT

A machine which can be used selectively for crossed axes gear shaving employing a gear-like shaving cutter having cutting edges in the sides of its teeth, and as a gear rolling machine employing a die in the form of a hardened gear. Provision is made for relative traverse while shaving in a direction occupying a plane parallel to the axes of the gear and tool, and for incremental infeed during shaving and continuous infeed during gear rolling.

15 Claims, 8 Drawing Figures

INVENTORS
BENJAMIN F. BREGI
CARL H. MOTZ
ARTHUR B. BASSOFF
BY Whittemore, Hulbert
& Belknap ATTORNEYS INVENTORS
BENJAMIN F. BREGI
CARL H. MOTZ
BY ARTHUR B. BASSOFF
*Whittemore, Hulbert & Belknap* ATTORNEYS

COMBINED GEAR SHAVING AND ROLLING MACHINE

SUMMARY OF THE INVENTION

At the present time a gear finishing operation in which a roughed-out work gear is rolled in tight mesh with a gear-like forming die has met with some success. This operation is in general alternative to a gear shaving operation.

In the case of gear rolling the metal in the teeth of the gear is displaced by a rolling operation to produce the required profile and surface finish on the teeth of the gear. In gear shaving metal is removed by a shaving operation to produce the required profile and surface finish on the gear teeth. Since both operations involve rolling the tool in tight mesh with the work gear, driving either the gear or tool in rotation while driving the other member solely through its meshed rotation therewith, it has been found that a machine provided with certain modifications may be used selectively either to roll finish work gears or to shave them.

In general, the machine configuration comprises a frame, a rotary work support, a rotary tool support, means mounting one of said supports on said frame for angular adjustment about the machine axis which is perpendicular to and intersecting the axes of both supports, a slide, rectilinear guide means mounting said frame for movement on said frame, means mounting the other of said supports on said slide, the direction of sliding movement of said slide being parallel to the aforesaid machine axis.

When the machine is used for shaving gears it may perform any one of several different types of gear shaving operations. In the first place the gear and tool may be rotated in tight mesh with their axes crossed in space, and given a relative traverse in a direction which may be parallel to the axis of the gear, perpendicular to the axis of the gear, or which may extend at an oblique angle with respect thereto. In this case incremental depth feed is provided between traverse strokes.

Alternatively, gears may be finished by shaving in an operation referred to as plunge shaving in which no relative traverse is provided and in which a single depth feed takes place to the required depth. In this case the gear and shaving cutter are positioned at relatively small crossed axes.

In gear rolling the usual practice is to provide a gear rolling die adapted to mesh with the gear with the axes of the gear and die parallel. Thereafter, relative depth feed is provided to reduce the dimensions of the gear to the finally desired dimensions and to produce the desired profile and surface finish on the teeth of the work gear. In this case the depth feed is continuous from a condition of loose mesh to final depth, but it is preferred to provide for infeed at a diminishing rate as the full depth position is approached.

Alternatively, it is possible with the present machine to perform a gear rolling operation in which the rolling die is adapted to mesh with the work gear with their axes crossed at a small angle, in which case relative traverse in a direction occupying a plane perpendicular to the machine axis will be provided. However, it is possible by employing relatively small crossed axes or a modified tooth form on the die to provide gear rolling at crossed axes without relative traverse.

DETAILED DESCRIPTION

Figure 1:
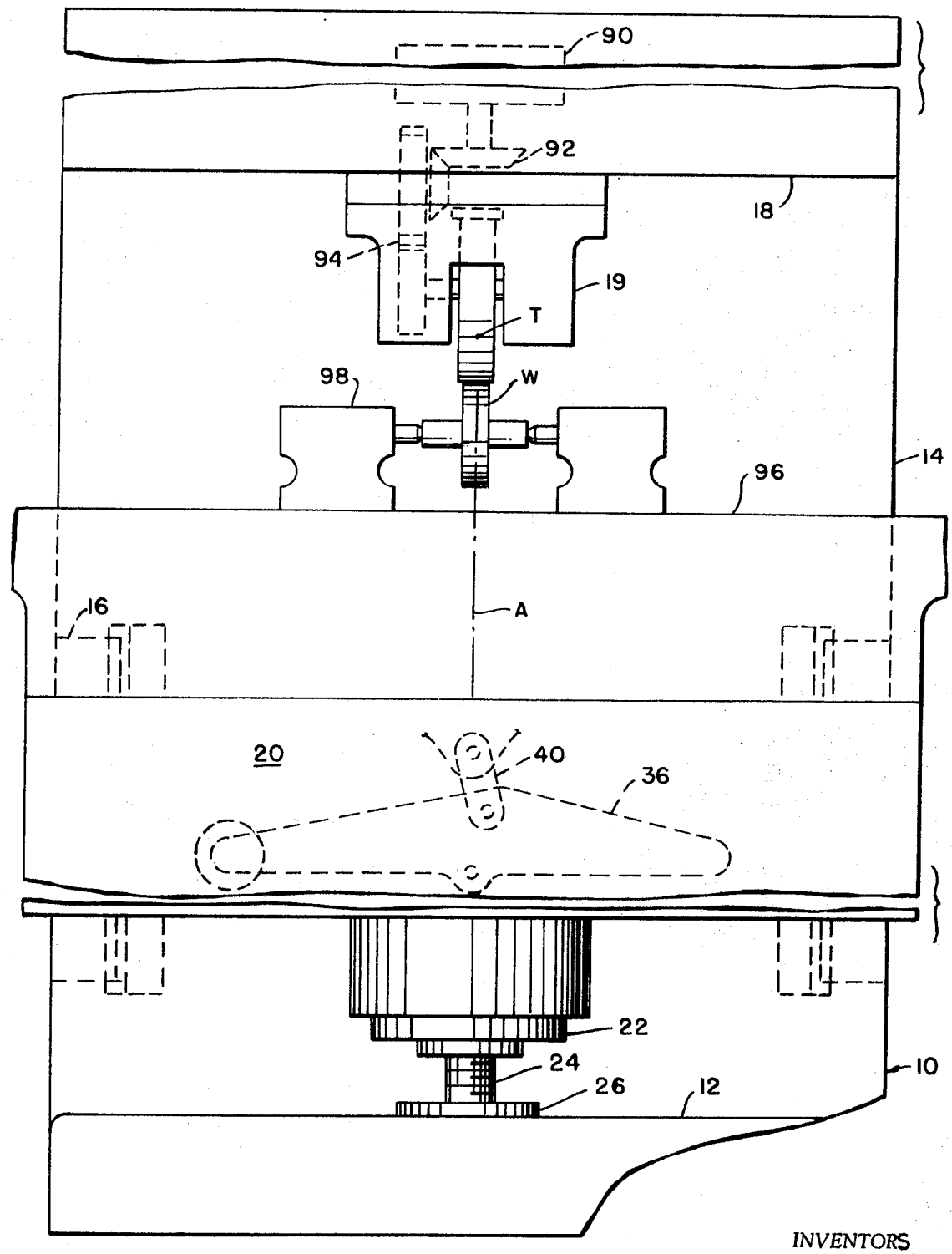
FIG. 1 is a front elevation of the combined gear shaving and gear rolling machine.

The machine comprises a frame generally indicated at 10 having a forwardly extending base portion 12, a column 14 provided with vertically extending rectilinear ways 16, and a forwardly projecting head portion 18. Secured to the underside of the forwardly projecting head portion 18 is a tool support 19 which is angularly adjustable about a vertical axis and which is adapted to carry a tool T, which in the embodiment illustrated in FIG. 1 is assumed to be a gear rolling die in tight mesh with the teeth of a work gear W. Mounted for vertical movement on the ways 16 is a work supporting slide 20.

It is necessary to effect a pre-setting vertical adjustment of the slide 20 and at the same time to provide for vertical movement of the slide between predetermined limits either in increments or in a continuous movement during a gear finishing cycle. In order to accomplish this there is provided within the slide 20 a housing 22 carrying a presetting screw 24 having its lower end threaded and received in a nut 26 fixedly received in the forwardly extending base portion 12 of the frame. At its upper end the screw 24 has fixed thereto a worm gear 28 which meshes with an adjusting worm 30 connected to a forwardly extending shaft 32 provided at the front of the machine with a head 34 for engagement by a hand wrench.

The housing 22 is connected to the slide 20 by automatic feed mechanism, later to be described. However, while the automatic feed mechanism is idle, it will be apparent that rotation of the worm 30 will result in vertical movement of the slide 20 so that the machine may be set to accommodate gears of different sizes.

The automatic feed mechanism which connects the slide 20 to the housing 22 comprises a toggle connection formed by the beam 36 which is pivoted to the top of the housing 22 as indicated at 38. The toggle is completed by a link 40 which is pivoted to the beam 36 as indicated at 42 and which is pivoted to the top of the slide 20 as indicated at 44. It will be appreciated that the toggle pivots are those shown at 38, 44 and 42, and when the beam 36 is swung to bring the pivot 42 into alignment with the pivots 38 and 44, the toggle is in the position of maximum extension.

Means are provided for swinging the beam 36 in order to effect vertical movement of the slide 20 and this means comprises a cylinder 46 fixed in the slide 20, having a piston 48 movable therein connected to a piston rod 50 to a link 52. The link 52 is pivotally connected to the piston rod 50 as indicated at 54, and has a pivot connection 56 to one end of the beam 36. Counterclockwise swinging movement of the beam 36 from an initial working position determined by engagement with an adjustable abutment 57 is accomplished by admitting fluid under pressure to the cylinder 46 beneath the piston 48.

With the housing 22 in a fixed position of adjustment, it will be apparent that vertical movement of the piston 48 will control the extension of the toggle formed by the beam 36 and the link 40, and accordingly, will control the vertical position of the slide 20.

As previously mentioned, it is desired to provide mechanism for effecting incremental vertical movement of the slide 20 while the machine is employed in gear shaving. For this purpose the other end of the beam 36 carries a roller 58 which is adapted to rest on one of the steps 60 of a stepped rotary cam 62 fixed to the upper end of a shaft 64 journaled for rotation in the slide 20. The cam 62 is provided with an abutment 65a which is adapted to engage an adjustable abutment 65b to limit rotation of the cam. The cam 62 has the steps 60 thereof provided in accordance with the desired infeed program of the machine and for different operations it will be understood that the stepped cam 62 may be removed and replaced with another.

Keyed to an intermediate portion of the shaft 64 is a ratchet wheel 66 and associated with the ratchet wheel 66 is a pawl 68 which is mounted on a swing arm 70 journaled on a projecting hub 72 of the ratchet wheel 66. The pawl 68 is operated by a piston and cylinder device 74 connected by a link 76 to an actuating arm 78 on the pawl. The piston and cylinder device 74 is mounted on the underside of a ledge 80 formed within the slide 20.

It will be appreciated that when the piston of the device 74 is retracted, the nose of the pawl 68 is withdrawn from the ratchet wheel 66 and the swing arm 70 will be moved a distance sufficient to permit engagement by the nose of the pawl 68 in the next notch of the ratchet wheel 66. Thereafter, outward movement of the piston will result in rotating the ratchet wheel 66 and hence the cam 62 by a predetermined increment.

In order to provide for return of the stepped cam 62, a pinion 82 is keyed to the shaft 64 and is in mesh with a rack 84 which is connected to a piston rod 86 extending from a piston and cylinder device 88.

Means are provided for driving the tool T in rotation and this means comprises a motor 90 which drives the tool through bevel gearing indicated at 92 and change gearing indicated generally at 94. With this arrangement it will be apparent that the tool support 19 may be angularly adjusted about a vertical axis to position the tool T with its axis parallel to the axis of the work gear W or at any selected crossed axes relationship.

Mounted on the top of the slide 20 is a table 96 having adjustable head and tailstocks 98 thereon for the reception of the work gear W.

In the machine arrangement illustrated it will be observed that the axes of the tool T and the work gear W are both horizontal and the vertical line intersecting the axes of the tool T and the work gear W constitutes the machine axis A.

Figures 2, 3:
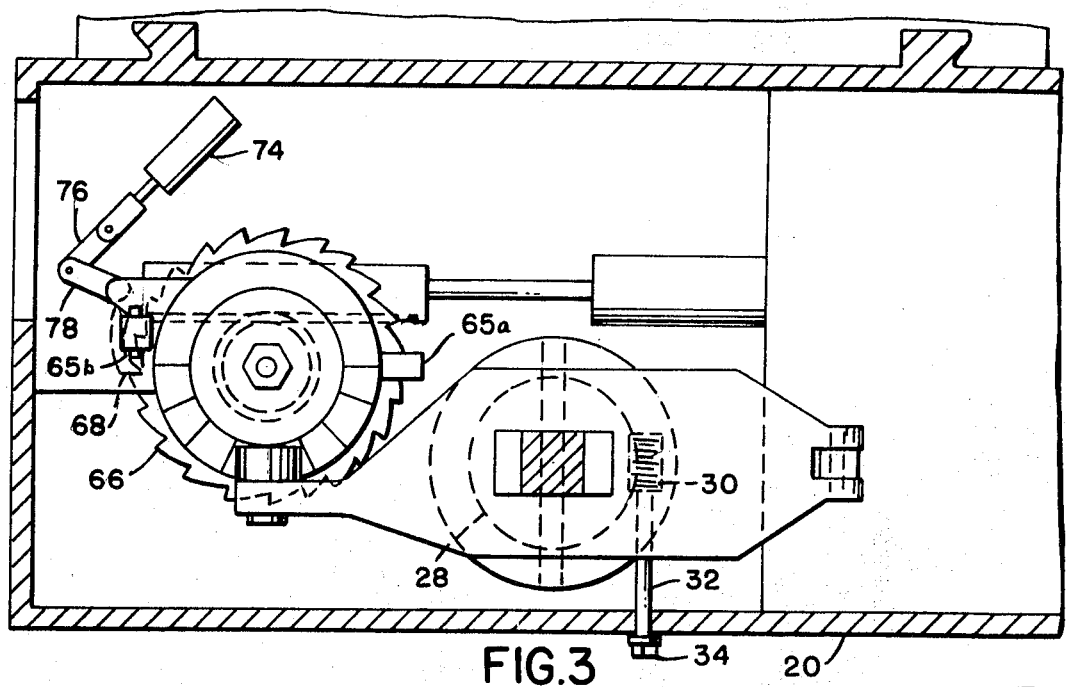
FIG. 2 is a fragmentary vertical sectional view primarily illustrating the work support slide.
FIG. 3 is a horizontal sectional view on the line 3—3, FIG. 2.

Instead of employing a cam the operative portion of which is composed entirely of the steps 60 as indicated in FIG. 2, the cam 100 may be employed, the operative portion of which is gradually inclined as indicated at 102. This cam also is provided with an abutment 104 adapted to engage an adjustable abutment 106 to limit rotation of the cam. In this construction the shaft 64 is provided with the pinion 82 as described above, cooperating with the rack 84 actuated by the piston and cylinder device 88. The beam 36 forming a part of the toggle connection between the housing 22 and the slide 20 is thus controlled in its infeeding motion by engagement between its roller 58 and the inclined surface of the cam 100. The beam 36 is connected to the piston 48 as previously described.

Figure 5:
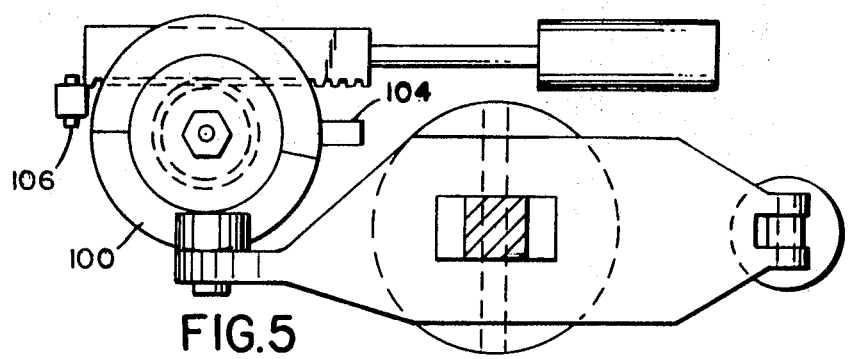
FIG. 5 is a fragmentary plan view of the structure shown in FIG. 4.

The arrangement illustrated in FIGS. 2 and 3 comprises the use of the stepped cam and the ratchet feed mechanism. The arrangement illustrated in FIGS. 4 and 5 involves the use of the cam provided with the gradually inclined surface 102, the cam being rotated by means of the rack 84 driving the pinion 82.

Figure 7:
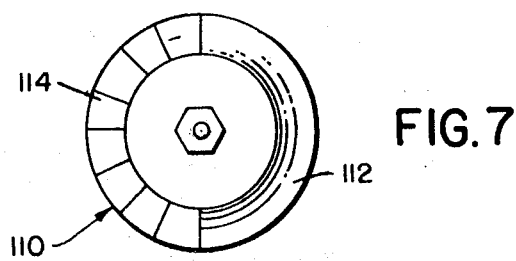
FIG. 7 is a plan view of the cam shown in FIG. 6.
Figure 6:
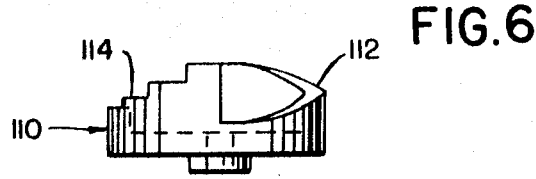
FIG. 6 is an elevational view of a single cam for providing both incremental and continuous infeed.

Referring now to FIGS. 6 and 7 there is illustrated a control cam 110 having a portion, as for example 180 degrees of its circumferential extent, provided with a continuously inclined cam surface 112, while the remainder of the cam has its active surface stepped to provide the steps indicated at 114. This cam may be substituted for the cam 62 or the cam 102 and provide for shifting between a gear shaving and gear rolling operation only by changing the initial position of the cam 110 and by appropriately controlling the application of fluid pressure to the various piston and cylinder devices.

Figure 8:
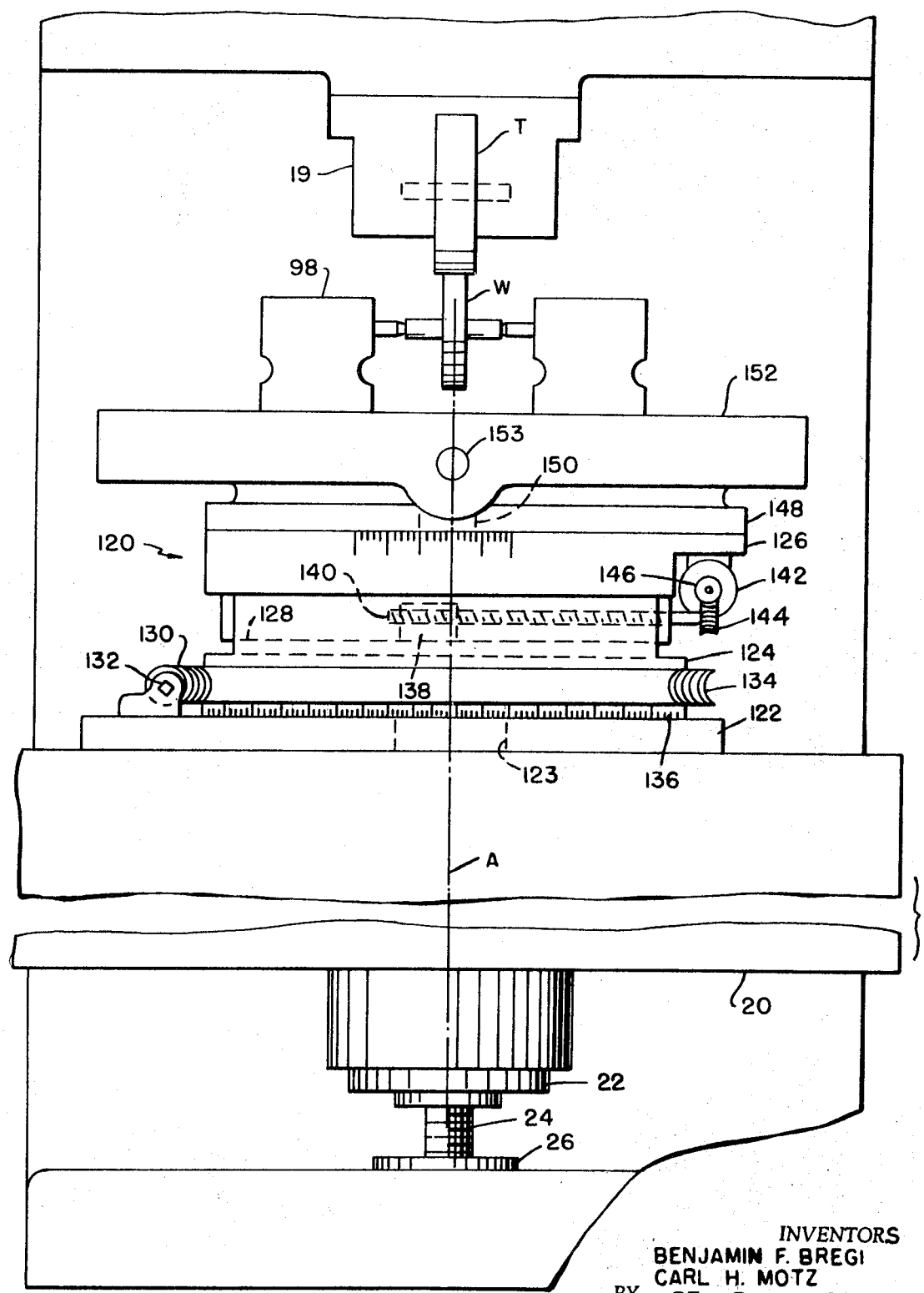
FIG. 8 is a view similar to FIG. 1 showing the machine arranged for crossed axes gear shaving.

Referring now to FIG. 8 there is shown the machine arrangement for gear shaving in which the table 96 shown in FIG. 1 has been replaced by a sandwich indicated generally at 120. This sandwich comprises a plate 122 fixed to the top of the slide 20 and provided with a locating recess 123 therein, centered on the machine axis A. Rotatably mounted on the plate 122 is a sub-table 124 on which a traverse slide 126 is guided by rectilinear horizontal ways 128. The sub-table 124 and traverse slide 126 may be angularly adjusted by means of an adjusting worm 130 manually rotatable by a square shaft end 132, the worm being meshed with a worm wheel 134. The angular setting of the sandwich comprising the sub-table 124 and the traverse slide 126 is indicated by suitable graduations shown at 136 on the sub-table 124.

Means are provided for effecting horizontal rectilinear traverse movement of the traverse slide 126 and this means comprises an upstanding nut 138 fastened to the sub-table 124 and receiving a traverse screw 140 supported on slide 126 and rotated by suitable means diagrammatically indicated as a motor 142 driving a worm gear 144 through a worm 146. It will of course be appreciated that any suitable means for effecting horizontal movement of the traverse slide 126 may be employed.

Rotatably mounted on the traverse slide 126 for horizontal traverse therewith is a secondary table 148. This table is guided for angular adjustment about a vertical axis with respect to the traverse slide 126 by suitable pilot means indicated diagrammatically at 150. This pilot will be located on the vertical machine axis A when the traverse slide 126 is in an intermediate position, but will be displaced from the vertical machine axis as the traverse slide is moved horizontally.

It will of course be appreciated that after effecting adjustments of the sandwich and associated parts about the vertical axis A, the parts are locked by suitable means against angular movement to retain the adjusted position.

In order to provide for crowning gears during a gear shaving operation, a main table 152 is provided on which the head and tailstocks 98 are provided. The table 152 is mounted for rocking movement about a horizontal axis 153 in order to provide crowning movement of the table as is well understood in the art.

With the foregoing arrangement the sub-table 124 and the traverse slide 126 may be adjusted as a unit about the vertical machine axis A to cause the rectilinear ways 128 to extend in any desired direction. Thus, the machine may be set for axial traverse, underpass, or diagonal traverse as desired. Similarly, by the provision of suitable camming means operable upon traverse of the table 152, the table may be caused to rock about its axis 153 to provide the crowning motion as described above.

OPERATION

In order to set the machine for use with any particular gear and tool, the angular position of the tool T is set as above described. The slide 20 is vertically adjusted by rotation of the worm 30 driving the worm gear 28 and thus rotating the screw 24 in the stationary nut 26. This results in vertical movement of the housing 22 and with the toggle mechanism in stationary position, it results in corresponding vertical movement of the slide 20. This adjustment is carried out to position a work gear W in a loose mesh relation to the tool T.

Assuming first that the operation to be performed is a gear shaving operation, the cam 62 or the stepped portion of the cam 110, is adjusted to position the highest operative step beneath the roller 58. Pressure is admitted to the cylinder 46 rocking the beam 36 in counterclockwise direction and partially extending the toggle connection. The motor 90 is operated to rotate the tool T, thereby driving the work gear W due to the meshed engagement between the parts. It will be appreciated that for the shaving operation the tool head 19 will be angularly adjusted to provide the desired crossed axes relationship, but that in general the main table 152 is positioned so that the axis of the work gear extends transversely across the front of the machine.

The sandwich made up of the sub-table 124 and the traverse slide 126 is adjusted to cause the ways 128 to extend in the desired direction. Motor 142 is energized to effect rotation of the feed screw 140 and traverse of the feed slide 126 takes place.

At the end of traverse the direction of the motor 142 is reversed and traverse in the opposite direction takes place. Relative incremental infeed is timed to take place at or near the end of each traverse stroke or alternate traverse strokes as desired.

In order to provide the incremental feed, pressure on the cylinder 46 is relieved without permitting escape of fluid from the cylinder, and the pawl 68 is actuated by admitting fluid to the cylinder 74 to first retract the piston and then to move it forwardly to extended position. This will advance the ratchet wheel 66 a predetermined distance to place the next lower step 60 of the cam under the roller. Pressure is again reestablished in the cylinder 46, thus tilting the beam 36 a little more than before, and thereby closing the toggle linkage slightly, thus raising the slide 20 by a predetermined increment. This procedure is repeated until the slide 20 reaches its maximum desired height at which time, following the final stroke or strokes of traverse, the return cycle of the cam is initiated. This is accomplished by reversing the application of pressure to the cylinder 46 to rock the beam 36 clockwise to limiting position determined by engagement between the adjustable abutment 57 and the roller 58, thus lowering the slide 20 and moving the gear G into a loose mesh condition with respect to the gear finishing tool T.

The foregoing frees the cam 62 for reverse rotation and this is accomplished by application of fluid under pressure to the piston and cylinder device 88 to move the rack 84 to the right as seen in FIG. 2, thus rotating the pinion 82 and the cam 62 to its initial position. This initial position may be determined by engagement between the abutment 65a on the cam and the abutment 65b, the abutment 65a being adjustable to various positions around the cam 62 if the design of the cam makes this desirable.

It will be appreciated that the machine as illustrated in FIG. 8 may be adjusted for a gear rolling operation to the illustrated position such that the axes of the tool T and the work gear W are parallel. For this purpose a cycle is completed without energizing the motor 142 and hence, no traverse takes place. However, for a gear rolling operation it is desirable to have a smooth continuous infeed, preferably one which decreases in velocity toward full depth position, and for this purpose the circular cam illustrated in FIGS. 4 and 5 may be substituted, or the dual purpose cam 110 illustrated in FIGS. 6 and 7 may be employed with appropriate angular adjustment to render the smooth inclined stop portion 112 effective.

Figure 4:
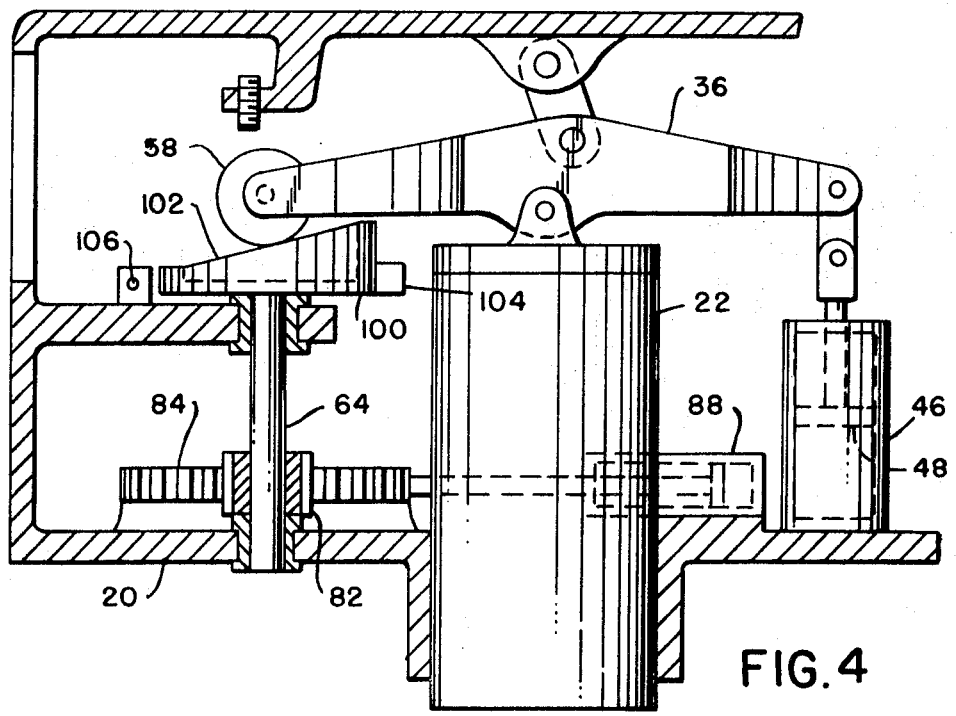
FIG. 4 is a fragmentary elevational view illustrating the arrangement for providing continuous infeed.

The operation for gear rolling comprises admitting fluid under pressure to the cylinder 46 to tilt the beam 36 so that the roller 58 contacts the smoothly inclined cam surface 102, as best illustrated in FIG. 4. At this time pressure is admitted to the cylinder 88 to effect movement of the rack 84 at a uniform controlled speed, thus rotating the shaft 64 and the cam 100 or 110 at a similarly controlled speed. Pressure is maintained in the cylinder 46 and thus, as the control cam is rotated, the toggle linkage straightens to elevate the slide 20 at a controlled speed. Control of the rate of movement of the rack 84 may be by control of the rate of admission of fluid under pressure to the cylinder 88 or it may be by control of the rate of flow of fluid out of the cylinder ahead of the advancing piston through a suitable metering valve (not shown).

When the toggle has straightened to the required extent, thus elevating the slide 20 and producing the required amount of infeed between the gear and tool, the control cam is maintained stationary for a desired interval after which the application of pressure to the cylinder 46 is reversed, thus breaking the toggle and lowering the slide 20 to its initial or loading position. At the same time, application of fluid pressure to the cylinder 88 is reversed, thus reversing rotation of the cam to its original start position.

While it is possible to employ the sandwich 120 during a gear rolling operation, the mechanism for angularly adjusting the direction of the ways 128 and the traverse mechanism including the motor 142, the feed screw 140 and the nut 138 are not employed.

Accordingly, it is preferred to substitute a simple table 96 as illustrated in FIG. 1, when the machine is to be used solely for the purpose of rolling gears. On the other hand, it should be noted that the sandwich assembly illustrated in FIG. 8 may also be employed for rolling gears in operations in which the gears are rolled at crossed axes and a relative traverse is provided during such rolling operation.

What we claim as our invention is:

1. A convertible gear shaving and rolling machine comprising a frame, a rotary tool support having an axis of rotation for supporting a gear-like tool, a rotary work support having an axis of rotation for supporting a work gear in mesh with the tool, means mounting one of said supports on said frame for angular adjustment about a machine axis perpendicular to and intersecting the axes of both of said supports, a slide on said frame movable parallel to the machine axis, one of said supports being mounted on said slide, means for driving one of said supports in rotation, selectively operable feed means for advancing said slide continuously for a gear rolling operation and incrementally for a gear shaving operation to cause the support carried by said slide to approach the other support, and selectively operable traverse mechanism interposed between one of said rotary supports and said frame for traversing said last named support back and forth in a plane perpendicular to said machine axis in timed relation to operation of said feed means for a gear shaving operation.

2. A machine as defined in claim 1 in which the tool support is mounted on the frame and the work support is mounted on the slide.

3. A machine as defined in claim 1 in which said traverse mechanism comprises a removable sandwich assembly adapted to be interposed between said slide and said work support, said sandwich assembly comprising a pair of members having interfitting rectilinear guide means extending perpendicular to said machine axis, and power means for effecting relative movement between said members along said guide means to cause traverse between a tool and work gear in a plane containing the axis of the work gear and parallel to the axis of the tool.

4. A machine as defined in claim 3 in which said sandwich is angularly adjustable about the machine axis to provide selection of the type of traverse between the gear and tool.

5. A machine as defined in claim 3 in which the power means is self-contained in said sandwich assembly.

6. A machine as defined in claim 4 in which the power means is self-contained in said sandwich assembly.

7. A machine as defined in claim 3 in which said sandwich assembly is readily removable from and attachable to said slide, and a work supporting block readily removable from and attachable to said slide for conversion of said machine to a gear rolling machine.

8. A machine as defined in claim 2 in which said feed means comprises a toggle connected between said frame and said slide, a fluid actuated piston and cylinder device connected to said toggle, and abutment means for limiting and controlling movement of said toggle towards extended position including an adjustably movable abutment member.

9. A machine as defined in claim 8, said abutment member comprising a stepped cam, and means for moving said abutment member incrementally to provide incremental relative infeed between the gear and tool.

10. A machine as defined in claim 3 in which said feed means comprises a toggle connected between said frame and said slide, a fluid actuated piston and cylinder device connected to said toggle, and abutment means for limiting and controlling movement of said toggle towards extended position including an adjustably movable abutment member.

11. A machine as defined in claim 10, said abutment member comprising a stepped cam, and means for moving said abutment member incrementally to provide incremental relative infeed between the gear and tool.

12. A machine as defined in claim 8, said abutment member comprising a cam having a smoothly inclined abutment surface, and means for moving said abutment member continuously to provide a continuous controlled relative infeed between said gear and tool to a predetermined depth.

13. A machine as defined in claim 8 in which said abutment member is rotatable in one direction to limit infeed between said tool and work gear, and fluid actuated means for reversely rotating said abutment member when said fluid actuated device is actuated to collapse said toggle to effect relative separation between said gear and tool.

14. A machine as defined in claim 8 in which said abutment member is rotatable and includes a shaving control portion having angularly spaced steps thereon for incremental infeed particularly useful in gear shaving, and a smoothly inclined portion for continuous infeed particularly useful in gear rolling.

15. A machine as defined in claim 14 which comprises means for effecting incremental rotation of said cam to limit extension of said toggle by said piston and cylinder device for gear shaving, and selectively operable means for effecting continuous rotation of said cam with its smoothly inclined portion in operative position for gear rolling.

* * * * *